Feb. 8, 1949.     H. E. BRANDT     2,461,106
PLUNGER STRUCTURE
Filed April 18, 1947

INVENTOR.
HENRY E. BRANDT
BY
Chas. C. Reif
ATTORNEY.

Patented Feb. 8, 1949

2,461,106

UNITED STATES PATENT OFFICE 2,461,106

PLUNGER STRUCTURE

Henry E. Brandt, North St. Paul, Minn.

Application April 18, 1947, Serial No. 742,297

11 Claims. (Cl. 309—4)

This invention relates to a structure of plunger and, while the invention might have various applications, it particularly is designed for use in a plunger movable in a cylinder such as used in an air pump. It has been a common practice to have a plunger rod with a plunger usually of cup shape secured thereto, said rod having a reduced threaded portion on which washers or plates were spaced at either side of the end of said cup shaped plunger, said reduced portion being threaded to receive a nut. With this commonly used structure it was necessary to remove the nut and one of said washers or plates if a new plunger were to be put in place. The cost of manufacture of the threaded rod was also considerable.

It is an object of this invention to provide a structure of plunger comprising a plunger rod with one or more members permanently attached thereto, as by riveting, together with a plunger and a member engaging the end of said plunger and having resilient parts adapted to spring under one of the members on said rod to hold said plunger in place.

It is a further object of the invention to provide a structure of plunger comprising a plunger rod, a member preferably of disk form having a hub secured to said rod, a plate preferably of circular form overlying said hub and permanently secured to said rod as by riveting, a cup shaped plunger having an apertured end surrounding said plate or washer, together with a second member engaging one side of said end and having a central portion with resilient parts adapted to spring under said plate or washer and hold said plunger in position.

It is more specifically an object of the invention to provide a structure of plunger comprising a plunger rod having a reduced end portion, a disk-like member having a central hub apertured to receive said reduced portion, a circular plate overlying said hub and apertured to receive said reduced portion, the end of said reduced portion being riveted over said plate so as to permanently attach said plate and member to said rod, a cup shaped plunger having an apertured end surrounding said plate, a second member having an annular portion of inverted trough shape engaging said end and having a central portion preferably of cylindrical form of circumferentially spaced, inwardly pressed portions adapted to spring under said plate and hold said plunger in position, together with a wick carried in said inverted trough shaped portion.

These and other objects and advantages of the invention will be fully set forth in the following description made in connection with the accompanying drawings in which like reference characters refer to the same parts throughout the different views, and in which—

Figure 1:
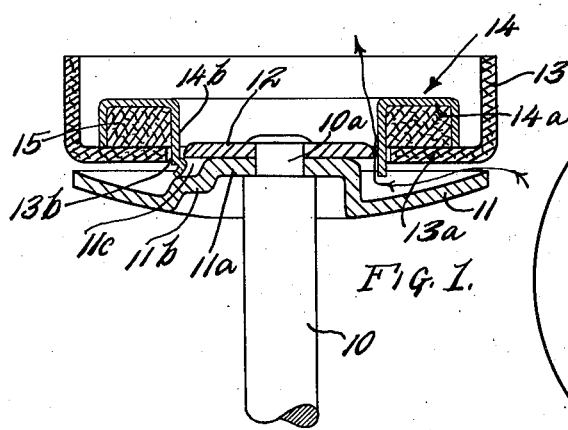
Fig. 1 is a central vertical section through a plunger embodying the present invention.
Figure 6:
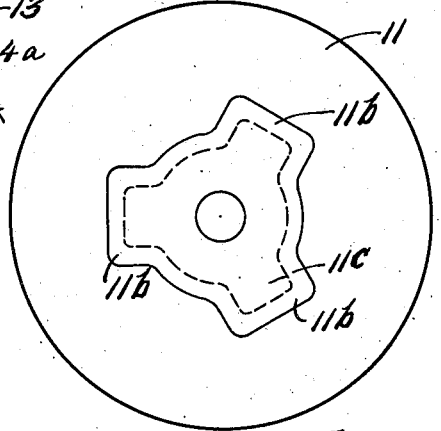
Fig. 6 is a top plan view of a disk member used.
Figure 3:
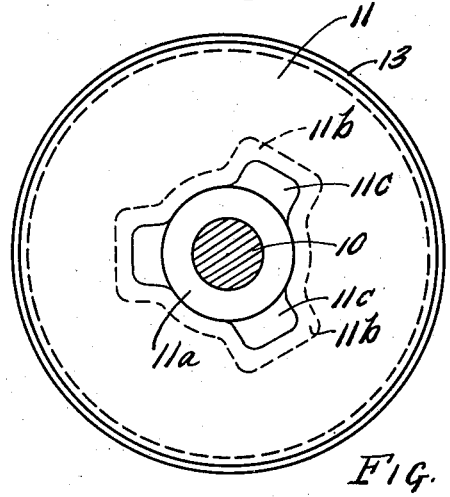
Fig. 3 is a bottom plan view of Fig. 1.
Figure 7:
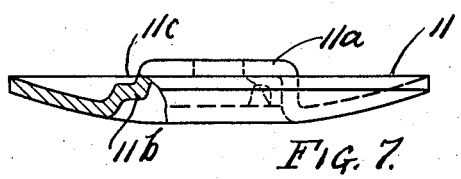
Fig. 7 is a view partly in side elevation and partly in central vertical section of the disk member shown in Fig. 6.

Referring to the drawings, a structure of plunger is shown comprising a plunger rod 10. Rod 10 has a reduced portion 10a at one end and a disk-like member 11 is provided having an upstanding or offset central hub 11a apertured to receive reduced portion 10a. The hub 11a at its top is provided with a plurality of circumferentially spaced depressed portions 11b forming spaced recesses 11c. While member 11 could be variously formed, in the embodiment of the invention illustrated it is shown as of concavo-convex form with its concave side at its top. A washer or circular plate 12 is provided centrally apertured to receive portion 10a, the same overlying hub 11a and projecting some distance beyond the same. The reduced portion 10a is riveted or welded over the plate 12 so that members 11 and 12 are securely and permanently attached to rod 10. A plunger 13 is provided and while this might be variously formed, in the embodiment of the invention illustrated it is shown as of cup shaped form, the same having a flat or disk-like end portion 13a having a central aperture 13b, said end portion 13a surrounding plate 12 and being adjacent the plane of plate 12 so that plate 12 is partially disposed in the aperture 13b. A holding member 14 is provided and while this might take various forms, in the embodiment of the invention illustrated it is shown as having an annular portion 14a of inverted trough shape, the outer side of which engages the outer side of end 13a or the side remote from member 11. Member 14 has a central portion 14b illustrated as of cylindrical form and portion 14b has pressed in parts or lugs 14c at circumferentially spaced points. In the embodiment of the invention illustrated there are three of the parts 14c. A wick 15 is disposed in portion 14a, said wick thus being of annular form and having one side engaging end 13a. Wick 15 will be of some porous fabric material such as felt. As shown in Fig. 1, wick 15 will be substantially rectangular in radial cross section.

Figure 4:
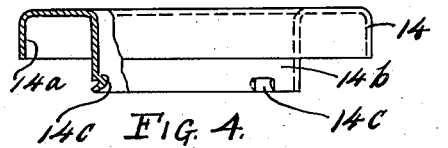
Fig. 4 is a view partly in side elevation and partly in central vertical section of a holding member used.
Figure 2:
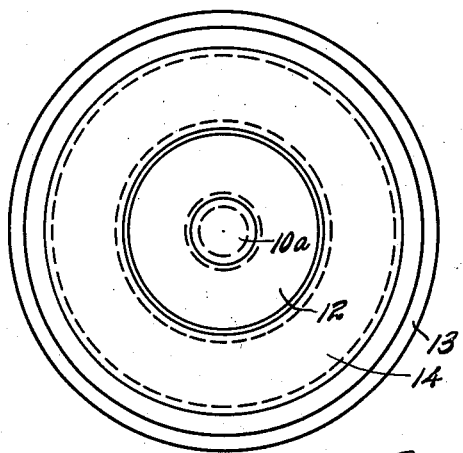
Fig. 2 is a top plan view of Fig. 1.
Figure 5:
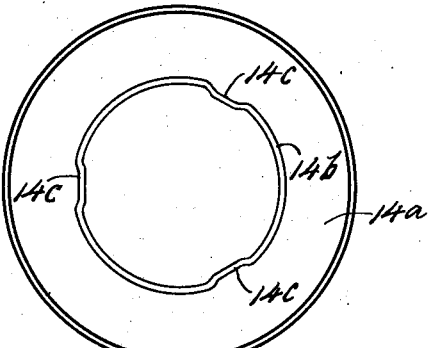
Fig. 5 is a bottom plan view of Fig. 4.

When the plunger is assembled members 11 and 12 will be permanently secured to rod 10 as above described. Plunger 13 will be formed and placed in position substantially as shown in Fig. 2. Wick portion 15 will be placed in member 14 and portion 14b will now be moved through opening 13b about plate 12 and will be forced down around plate 12, the same compressing or distorting sufficiently to permit portions 14c to resiliently snap or spring under plate 12. Portions 14c will be aligned with the recesses 11c. Member 14 and wick 15 now engage the end 13a and plunger 13 is held securely in position. Wick 15 will be suitably saturated with some lubricant and this will pass into plunger 13 which will be of leather or some similar material so that plunger 13 is kept lubricated. When it is desired to remove plunger 13 as when a new one is to be put in place, the portion 14b can be readily sprung upward by inserting a screw driver or other tool thereunder. Member 14 can thus be removed and plunger 13 then lifted and removed. With the described structure it is not necessary to unscrew a nut and remove a washer as has heretofore been customary. A nut often becomes corroded and stuck to the threads of the rod so that it is difficult to remove. With the present structure all that is necessary is to pry member 14 loose. It is also a much less difficult and less expensive job in a shop to secure members 11 and 12 to plunger 10. The washer or plate 12 is provided with a rounded edge at its outer side so that portion 14b will readily move thereover. When plunger 13 and rod 10 are moved on the air compressing stroke, which would be upward, as seen in Fig. 1, plunger 13 will expand somewhat at its periphery and will move down in engagement with member 11 so as to be backed or supported thereby. The air thus cannot pass plunger 13. When the plunger moves on the air intake stroke, which would be downwardly, as seen in Fig. 1, plunger 13 moves away from disk 11, as shown in Fig. 2, and air can then be drawn past plunger 13 by moving over disk 11 and through aperture 13b, as indicated by the arrow line in Fig. 1.

From the above description it will be seen that I have provided a simple, efficient and inexpensive structure of plunger. The structure permits ready removal of the plunger member so that it can be readily removed and replaced when desired. The parts are quite simple and can be easily and inexpensively made. The device has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A plunger structure having in combination, a plunger rod, a member secured to said rod adjacent the end thereof, a washer overlying said member and spaced therefrom at circumferentially spaced points and secured to said rod, a cup-shaped plunger having a peripheral flange directed away from said member and having an apertured inner end extending about said washer adjacent the plane thereof, and a member engaging the outer side of said inner end and having a central portion with resilient parts constructed and arranged to engage under said washer to hold said plunger in place.

2. A structure of plunger for a cylinder having in combination, a plunger rod, a disk-like member having a hub portion apertured for and secured to said rod, a plate overlying said hub and projecting outwardly therefrom, a cup-shaped plunger having an apertured end surrounding said plate, a second member having portions engaging the side of said end remote from said plate and having a central portion having spaced resilient parts adapted to engage under said plate to hold said plunger in place.

3. The structure set forth in claim 2, said hub having spaced depressed portions to accommodate said last mentioned parts.

4. A structure of plunger for a cylinder having in combination, a plunger rod, a concave disk-like member having a hub secured to said rod adjacent the end thereof, a plate overlying said hub and secured to said rod, a cup-shaped plunger having a cylindrical wall and an aperture disk-like end extending about said plate, a second member engaging the side of said end within said wall and having a central portion with spaced resilient parts adapted to be engaged under said plate to hold said plunger in position.

5. A structure of plunger for a cylinder having in combination, a plunger rod, a disk-like member having a central hub secured to said rod adjacent the end thereof, a circular plate overlying said hub secured to said rod, a cup-shaped plunger having an apertured disk-like end surrounding said plate, a second member having an annular portion of inverted trough shape engaging the side of said disk-like end opposite said first mentioned member, and having a cylindrical central portion having inwardly pressed spaced resilient parts adapted to spring under said plate to hold said plunger in position.

6. The structure set forth in claim 5, said hub having spaced depressed portions for accommodating said parts.

7. A structure of plunger for a cylinder having in combination, a plunger rod, a member having a central hub secured to said rod adjacent the end thereof, a circular plate overlying said hub, said rod having a reduced portion extending through said hub and plate and riveted over the top of said plate, a cup-shaped plunger having an apertured flat end surrounding said plate, a second member having an annular portion engaging said flat end and having a central cylindrical portion having spaced resilient parts adapted to spring under and be disposed under said plate to hold said plunger in position.

8. The structure set forth in claim 7, said annular portion being of inverted trough shape and a wick disposed therein in engagement with said plunger.

9. The structure set forth in claim 7, said hub having spaced depressed portions adapted to align with and accommodate said parts.

10. The structure set forth in claim 7, said first mentioned member having a disk-like portion about said hub disposed adjacent said plunger and forming a backing therefor.

11. A plunger structure having in combination, a plunger rod, a plate-like member secured to said rod adjacent the end thereof, a cup-shaped plunger having a peripheral flange directed away from said member and having a substantially flat apertured end extending about said plate adjacent the plane thereof, and a member engaging the outer sides of said flat end and having circumferentially spaced resilient parts constructed and arranged to engage under said plate to hold said plunger in place whereby said parts can be sprung to release said last mentioned member and plunger.

HENRY E. BRANDT.

REFERENCES CITED

The following references are of record in the file of this patent:

UNITED STATES PATENTS

| Number | Name | Date |
| --- | --- | --- |
| 1,531,234 | Davis | Mar. 24, 1925 |
| 2,055,104 | Hewitt et al. | Sept. 22, 1936 |
| 2,089,963 | Johnson | Aug. 17, 1937 |